US009809255B1

United States Patent
Chuang et al.

(10) Patent No.: US 9,809,255 B1
(45) Date of Patent: Nov. 7, 2017

(54) VEHICLE UNDERBODY STRUCTURE FOR MULTIPLE LOAD PATHS

(71) Applicant: Ford Global Technologies, LLC, Dearborn, MI (US)

(72) Inventors: Ching-Hung Chuang, Northville, MI (US); Ren-Jye Yang, Troy, MI (US); Rahul Arora, Royal Oak, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/184,084

(22) Filed: Jun. 16, 2016

(51) Int. Cl.
*B60N 99/00* (2006.01)
*B62D 21/15* (2006.01)
*B62D 21/11* (2006.01)

(52) U.S. Cl.
CPC ............ *B62D 21/155* (2013.01); *B62D 21/11* (2013.01)

(58) Field of Classification Search
CPC ............................ B62D 21/155; B62D 21/11
See application file for complete search history.

(56) References Cited

U.S. PATENT DOCUMENTS

| | | | |
|---|---|---|---|
| 5,048,888 A * | 9/1991 | Willy | B62D 21/152 296/187.03 |
| 5,729,463 A | 3/1998 | Koenig et al. | |
| 8,219,365 B2 | 7/2012 | Allen et al. | |
| 8,755,923 B2 | 6/2014 | Farahani et al. | |
| 2010/0171340 A1 * | 7/2010 | Yasuhara | B62D 21/11 296/205 |

\* cited by examiner

*Primary Examiner* — Lori L Lyjak
(74) *Attorney, Agent, or Firm* — Jason Rogers; Brooks Kushman P.C.

(57) ABSTRACT

A vehicle an underbody structure includes a bumper, a subframe, and a frame. The frame interconnects the bumper and the subframe. The frame includes first and second symmetrical halves spaced at a distance. The frame is attached to the bumper at front segments of each of the halves, and to the subframe at rear segments of each of the halves. The halves are defined by a plurality of legs formed with the front and rear segments such that the first and second halves define load paths configured to transfer energy throughout the frame.

20 Claims, 2 Drawing Sheets

VEHICLE UNDERBODY STRUCTURE FOR MULTIPLE LOAD PATHS

TECHNICAL FIELD

The present disclosure relates to a vehicle underbody structure that accounts for multiple load paths due to differing impact scenarios.

BACKGROUND

Vehicle underbody structures may connect vehicle frames to vehicle floors. Typically, underbody structures define a rigid subframe to provide added support between the frame and the floor. The underbody structure may support certain vehicle components such as the engine, drivetrain, or suspension. The underbody structure allows for the distribution of weight of the vehicle components across the vehicle. This allows for better vehicle performance and, as such, improves fuel efficiency.

SUMMARY

A vehicle underbody structure includes a bumper, a subframe and a frame. The frame interconnects the bumper and the subframe at front and rear segments. The frame has a first half separated at a distance from a second half mirrored about a longitudinal axis. The first and second halves define an area between at least five legs connected to the front and rear segments at first and second apexes of at least two of the five legs.

A vehicle an underbody structure includes a bumper, a subframe, and a frame. The frame interconnects the bumper and the subframe. The frame includes first and second symmetrical halves spaced at a distance. The frame is attached to the bumper at front segments of each of the halves, and to the subframe at rear segments of each of the halves. The halves are defined by a plurality of legs formed with the front and rear segments such that the first and second halves define load paths configured to transfer energy throughout the frame.

A frame for a vehicle includes a plurality of legs joined at a front segment to attach to a bumper and joined at a rear segment to attach to a subframe disposed opposite the front segment. The legs are arranged to form a first half and a second half separated by a support and mirrored across a longitudinal axis. The legs are configured to form a substantial trapezoidal area between the legs such that the legs define a plurality of load paths across and throughout the front segment, the rear segment and the support.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
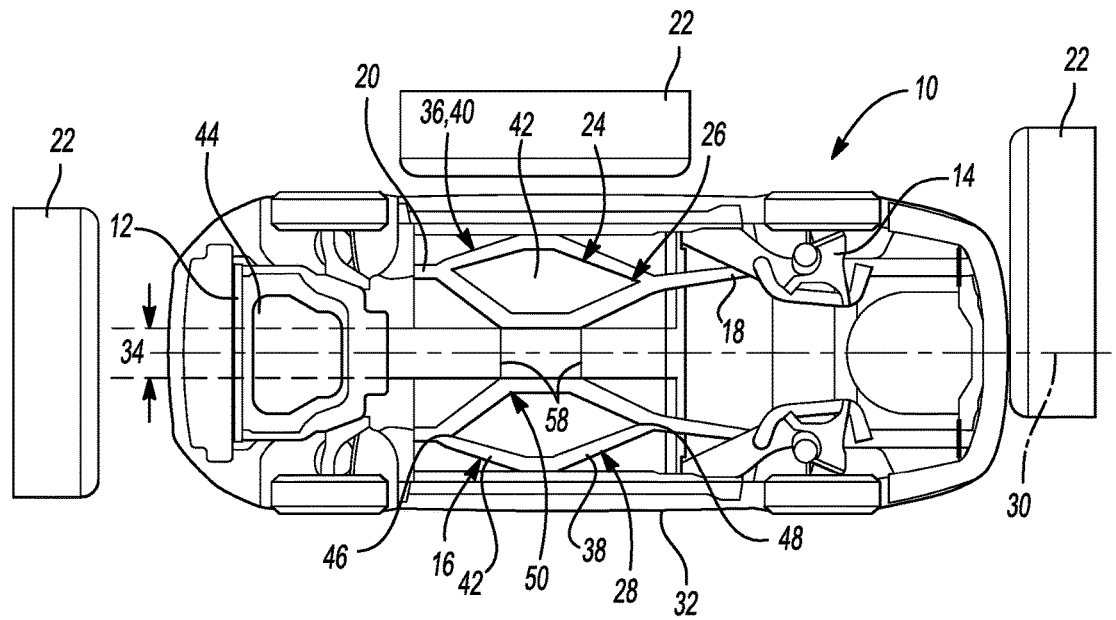
FIG. 1 is a bottom view of a vehicle having a frame absorbing energy from a variety of impact scenarios.

FIG. 1 is a bottom view of a vehicle 10 including a bumper 12, a subframe 14 and a frame 16. The frame 16 extends between the bumper 12 and the subframe 14. The frame 16 connects to the subframe 14 at a rear segment 18 and connects to the bumper 12 at a front segment 20. The frame 16 is configured to absorb and transfer energy throughout the vehicle 10 in the event of an impact. As shown in FIG. 1, the vehicle 10 may be impacted by a variety of barriers 22 and in a variety of circumstances. For example, the barriers 22 depicted in FIG. 1 are representative of various types of side impact and pole impact events. The frame 16 may be configured to absorb and transfer energy from at least the impacts shown. The frame 16 may further be configured to absorb and transfer energy from other impacts such as, but not limited to, full frontal impact, frontal offset impact, frontal small offset impact, rear direct impacts, as well as rear side impacts.

The frame 16 may be configured to absorb energy from each of the barriers 22 individually, or simultaneously as shown. Controlling the transfer of energy through the vehicle 10 during an impact further improves occupant safety. For example, directing energy through the frame 16 may strengthen the overall structural integrity of the vehicle 10 and reduce intrusion into a cabin (not shown) of the vehicle 10. Therefore, even in the event of multiple impacts from the barriers 22, the vehicle 10 may further provide and accomplish various impact testing standards. The frame 16 defines a geometry 24, which allows the vehicle 10 to absorb and direct impact energy throughout the frame 16. Optimization of the geometry 24 may not only provide further impact energy absorption but may also improve other performance characteristics of the vehicle 10, such as fuel economy.

By optimizing the geometry 24 of the frame 16 the overall weight of the vehicle 10 may be reduced. Further, using the geometry 24 of the frame 16 to further aid in transferring impact energy throughout the frame 16 reduces the material needed to provide a frame 16 capable of absorbing energy pursuant to industry standards as well as allows for different, lightweight materials to construct the frame 16. Optimization of the frame 16 allows for a redistribution of the materials needed for the frame 16 to account for energy absorption impact test requirements. As will be detailed below, optimization of the frame 16 provides consideration to determine the most efficient layout of the frame 16 to manage energy absorption along two different directions as well as weight and fuel economy of the vehicle 10.

The frame 16 includes a first half 26 and a second half 28. The first and second halves 26, 28 are designed to be symmetrical about a longitudinal axis 30. For example, the second half 28 may be mirrored about the longitudinal axis 30 to complement the first half 26, which allows the frame 16 to account for various loading characteristics on each side 32 of the vehicle 10. As by way of example, FIG. 1 depicts a side impact on a left side 32 of the vehicle and the symmetry of the frame 16 between the first and second halves 26, 28 allows the frame to absorb and transfer energy through the frame 16 during a side impact on a right side 32 of the vehicle. Likewise, the symmetry of the frame 16, in which the second half 28 is a mirror image of the first half 26 also allows the frame to absorb and transfer energy during impacts having an opposite orientation shown in FIG. 1 as well as the additional impacts discussed above.

In the embodiment shown in FIG. 1, the first half 26 may be spaced at a distance 34 from the second half 28. The first and second halves 26, 28 are formed from a plurality of legs 36. The plurality of legs 36 is defined by at least five individual legs 38. The plurality of legs 36 may be formed integrally as a single component 40 representative of either the first or second halves 26, 28. At least one other embodiment, the plurality of legs 36 may be joined using common joining techniques, such as but not limited to, welding, fastening, adhering, or any other joining method. The plurality of legs 36 is joined to encompass an area 42 with in the plurality of legs 36. The area 42 between the plurality of legs 36 may define a substantially trapezoidal shape. The area 42 further allows the frame 16 to absorb and transfer energy through the plurality of legs 36 to account for various impact scenarios.

Using the side impact barrier 22 as an example, the area 42 allows the plurality of legs 36 to flex when impacted. For example, during a side impact with the barrier 22, the plurality of legs 36 may flex into the area 42 defined by each individual leg 38 without intruding across the longitudinal axis 30 to further absorb and direct energy throughout the frame 16. As will be described in detail below, by defining the area 42 between the legs 38 the energy from the impact may be transferred through the plurality of legs 36 to provide structural rigidity to the vehicle 10 and the frame 16. While depicted and described as a substantially trapezoidal shape formed by the plurality of legs 36, other shapes and orientations may be used to define the area 42 that allows the frame 16 to account for various impacts. The area 42 may be sized depending on the loading characteristics of various impacts. The area 42 defined by the plurality of legs 36 may be dependent on a variety of factors based on the design of the vehicle 10. For example, the shape and size formed by the plurality of legs 36 to define the area 42 may be dependent on packaging space required for various vehicle components 44.

Various vehicle components 44, such as the engine and transmission, may require different packaging spaces and have a different impact on vehicle performance during dynamic loading based on the weight of the vehicle components 44. For example, different vehicle types may require different vehicle components 44 that have different masses and sizes. The inertia associated with the vehicle components 44 having different weights requires consideration during optimization of the frame 16, and likewise, the orientation of the plurality of legs 36 to adequately distribute impact energy throughout the vehicle 10. In a similar manner, the size of the vehicle components 44 impacts the packaging space for placement of the frame 16. The plurality of legs 36 may define the area 42 based on the available package resulting from the necessary components 44 to operate the vehicle 10, such as the engine and transmission. Therefore, the area 42 defined by the plurality of legs 36 is based on the size and mass of the vehicle components 44.

As stated above, the frame 16 attaches to the bumper 12 at a front segment 20 and the subframe 14 at a rear segment 18. Specifically, the frame 16 attaches to the bumper 12 at a first apex 46 of the front segment 20 defined by the plurality of legs 36. The frame 16 attaches to the subframe 14 at a second apex 48 of the rear segment 18 defined by the plurality of legs 36. The first and second apexes 46, 48 may be defined by at least two legs 38 of the plurality of legs 36. The first and second apexes 46, 48 are defined such that energy from an impact is distributed throughout the frame 16. The first and second apexes 46, 48 are disposed on both the first and second halves 26, 28. For example the first half 26 includes a first and second apex 46, 48 defined from at least two legs 38 and the second half 28 also includes a first and second apex 46, 48 defined from at least two legs 38 of the frame 16. The first and second apexes 46, 48 defined on both the first and second halves 26, 28 are equal due to the mirrored symmetry about the longitudinal axis 30, discussed above.

In a similar manner, the plurality of legs 36 is joined such that a plurality of corners 50 is formed between two adjoining legs 38 on the first and second halves 26, 28. The plurality of corners 50 along with the first and second apexes 46, 48 allow the frame 16 to flex and further aid the frame 16 to absorb energy during impact. Therefore, the plurality of legs 36 may be formed integrally, as described above, such that the plurality of corners 50 maintains contact between at least two legs 38. The plurality of corners 50 are configured to absorb strain associated with the impact energy generated on the frame 16 through the plurality of legs 36 during an impact. Again, the plurality of corners 50 is equal between the first and the second halves 26, 28 due to the mirrored symmetry about the longitudinal axis 30.

Figure 2:
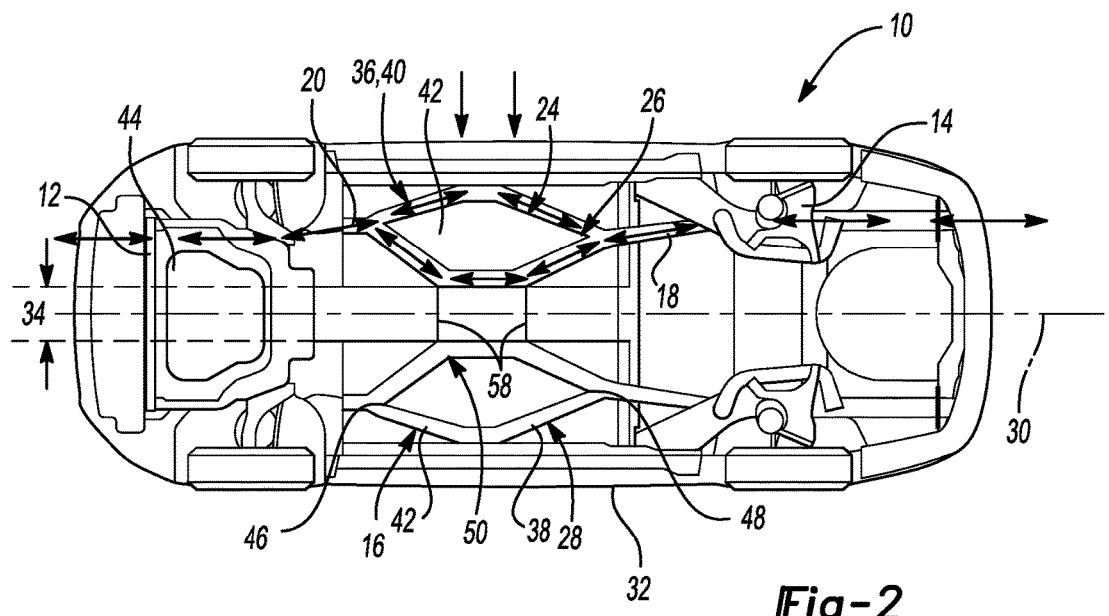
FIG. 2 is a bottom view of a vehicle having a frame showing one embodiment of a load path through the vehicle frame.

Referring to FIG. 2, a bottom view of the vehicle 10 showing the vehicle frame 16 is depicted. FIG. 2 depicts a first embodiment of the frame 16 and the associated load paths 52, 54 throughout the frame 16 in the event of any of the impacts described above. When the vehicle 10 is impacted, energy from the impact is distributed throughout the frame 16. Using the plurality of legs 36, as described above, energy from an impact gets split into two directions. For example, during a side impact, the corners 50 defined from the at least two legs 38 of the plurality of legs 36 split the direction of energy transfer through the frame 16 into directions defining first and second load paths 52, 54 across the first half 26. As stated above, due to the mirrored symmetry about the longitudinal axis 30, the second half 28 also splits impact energy into first and second load paths 52, 54. By splitting the impact energy into first and second load paths 52, 54, the vehicle frame 16 is able to absorb more energy and account for multiple impact scenarios.

As can be seen in FIG. 2, splitting the impact energy through first and second load paths 52, 54 also occurs during frontal and rear impacts at the first and second apexes 46, 48, respectively. By splitting the load paths 52, 54 into directions through the plurality of legs 36, less strain is imparted on the vehicle frame 16. The orientation of the plurality of legs 36 forces the load paths 52, 54 to change directions at the plurality of corners 50. The change of direction at the plurality of corners 50 allows the frame 16 to absorb more energy from the impact as the energy travels throughout the frame 16. By forcing the load paths 52, 54 to change direction at the plurality of corners 50, the frame 16 provides greater structural rigidity and greater optimization of the overall frame structure.

Further, the plurality of corners 50 divides the energy absorbed by the plurality of legs 36 to allow the frame 16 to absorb maximum energy from an impact. For example, FIG. 2 depicts the plurality of legs 36 forming at least six individual corners 56 defined within the plurality of corners 50 at the intersection between at least two legs 38. When the vehicle 10 is impacted in any direction, the load paths 52, 54 are directed through the plurality of legs 36 and across the at least six corners 56. Therefore, the load paths 52, 54 divide the inner impact energy across the at least six corners 56, which reduces the overall strain on each of the legs 38 of the frame 16. While shown and described as at least six corners 56, the arrangement and orientation of the plurality of legs 36 may be optimized to include more or less corners 56 based on optimal loading characteristics of various impacts, available packaging space within the vehicle 10, weight of the vehicle 10, or redirection of the load paths 52, 54 throughout the frame 16.

While shown and described on the first half 26, energy transfer through the second half 28 is substantially similar to the energy transfer described through the first half 26. Again, due to the symmetry about the longitudinal axis 30, the second half 28 of the frame 16 allows the frame 16 to define the first and second load paths 52, 54 throughout the plurality of legs 36 defining the second half 28. Likewise, the second half 28 directs and divides the impact energy absorbed through the frame 16 at the plurality of corners 50 such that the intersection between at least two legs 36 defines an individual corner 56. Since the second half 28 is mirrored about the longitudinal axis 30 to be substantially identical to the first half 26, the plurality of corners 50 define at least six corners 56 to divide the impact energy throughout the frame 16. As described above, the symmetry between the first half 26 in the second half 28 allows the vehicle 10 and specifically the frame 16 to further absorb energy while providing structural rigidity to the vehicle 10 during multiple impact scenarios, either individually or simultaneously.

Figure 3:
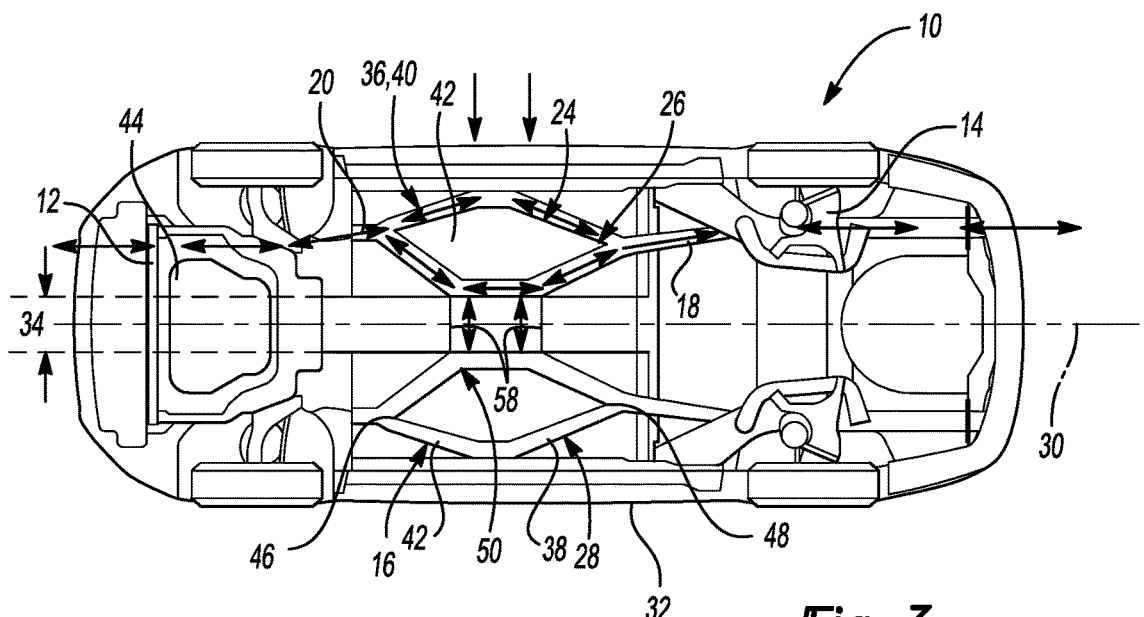
FIG. 3 is a bottom view of a vehicle having a frame showing another embodiment of a load path through the vehicle frame.

FIG. 3 depicts a further embodiment of the symmetrical frame 16 for the vehicle 10. The embodiment depicted in FIG. 3 interconnects the first half 26 with the second half 28 of the frame 16 using a support 58. The support 58 is centered along the longitudinal axis 30 and interconnects two horizontally disposed legs 38 from each of the first half 26 in the second half 28. The support 58 is configured to transfer energy from the first half 26 to the second half 28. The support 58 further allows the distribution of energy through the plurality of legs 36 of the frame 16. The support 58 provides a further change of direction of the energy absorbed during an impact to provide a further division of the energy through the plurality of legs 36, which further aids the structural rigidity of the vehicle 10.

For example, in the event of a side impact, the support 58 may be configured to further distribute the energy from the first half 26 to the second half 28 and therefore divide the energy by the plurality of corners 50 associated with the second half 28. In a similar manner, the support 58 may also be configured to further distribute the energy from the second half 28 to the first half 26 and therefore divide the energy by the plurality of corners 50 associated with the first half 26. While described using a side impact, the support 58 may be configured to transfer energy between each of the other halves 26, 28 during any impact in which a horizontal component is derived from the impact. Therefore, the support 58 may be configured to define a third load path 60 across the longitudinal axis 30 from either of the first or second halves 26, 28 and depending on the loading characteristics from multiple impacts, either individually or simultaneously.

Defining a third load path 60 provides further structural rigidity to the frame 16 and the vehicle 10. The support 58 provides a rigid attachment between the first half 26 and the second half 28. The support 58 allows the first half 26 in the second half 28 of the frame 16 to be unitary. For example, as stated above, the support 58 extends across the longitudinal axis 30 and connects the horizontal legs 38 of the first half 26 in the second half 28 and therefore, when impacted, in a direction perpendicular to the longitudinal axis 30, the frame 16 may flex into the area 42 defined by a plurality of legs 36 on both the first and second halves 26, 28. As detailed above, when the frame 16 flexes energy is absorbed by the frame. Therefore, the support 58 further allows the frame 16 to divide energy absorption from an impact through and between the first and second halves 26, 28. Again, dividing energy absorption throughout the entire frame 16 by allowing both the first and second halves 26, 28 to flex in the event of a side impact allows the frame 16 via the support 58 to be more rigid and provide greater overall structural integrity to the vehicle 10.

Figure 4:
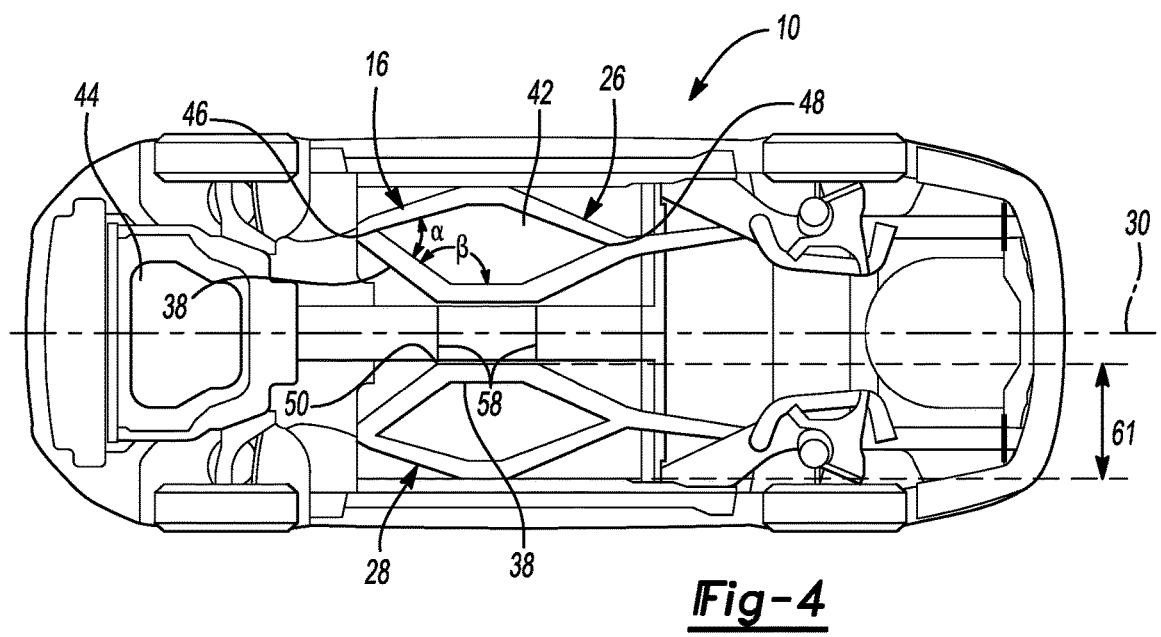
FIG. 4 is a bottom view of the frame for the vehicle.

FIG. 4 depicts a bottom view of the first and second halves 26, 28 of the frame 16 and the plurality of legs 36 defining the area 42 and trapezoidal shape of the first and second halves 26, 28. As stated above, the plurality of legs 36 form first and second apexes 46, 48 and include a plurality of corners 50. The first and second apexes 46, 48 may define a first angle $\alpha$ and the plurality of corners 50 may define a second angle $\beta$. The first and second angles $\alpha$, $\beta$ may be optimized based on the loading dynamics of various impacts, the inertia of the vehicle components 44, as well as the available packaging space for the frame 16. Again, while shown and described on the first half 26, the second half also includes the first angle $\alpha$ and the second angle $\beta$ and the first and second angles $\alpha$, $\beta$ on the second half 28 act in a similar manner as the first and second angles $\alpha$, $\beta$ within the first half 26, as detailed below.

For example, the first angle $\alpha$ may be such that the two legs 38 that form the first angle $\alpha$ are capable of slight movement that causes flexing of the plurality of legs 36 to cause small variations of the first angle $\alpha$. In a similar manner, the first angle $\alpha$ may be configured such that the first and second apexes 46, 48 form two distinct load paths 52, 54 of impact energy across the frame 16, as described above. Stated differently, the first angle $\alpha$ may be large enough to divide the impact energy across the plurality of legs 38 but small enough to fit within the designated packaging space for the frame 16. The first angle $\alpha$ allows the frame 16 via the plurality of legs 36 to divide and therefore form the load paths 52, 54 such that a maximum amount of energy is distributed throughout the frame 16 to reduce intrusion and increase structural rigidity of the vehicle 10.

Likewise, the second angle $\theta$ may be such the at least two legs 38 that form the second angle $\theta$ are also capable of slight movement that causes flexing of the plurality of legs 36 to cause small variations of the second angle $\beta$. In a similar manner, the second angle $\theta$ may be configured such that the at least two legs 38 force the load paths 52, 54 to change direction in order to further absorb impact energy across the frame 16, as described above. Stated differently, the second angle $\beta$ may be large enough to cause a change of direction in the load paths 52, 54 but small enough to fit within the designated packaging space for the frame 16. The second angle $\beta$ allows the frame 16 via the plurality of legs

36 to direct the load paths 52, 54 such that a maximum amount of energy is distributed throughout the frame 16 to reduce intrusion and increase structural rigidity of the vehicle 10.

As stated above, the plurality of legs 36 may also include at least two horizontal legs 38. The at least two horizontal legs 38 may be defined entirely on the first half 26 or the second half 28 and the first half 26 may be interconnected to the second half 28 via the support 58 at one of the horizontal legs 38 of both the first and second halves 26, 28. The area 42 defined by the substantial trapezoidal shape of the plurality of legs 38 is further defined by a distance 61 between the horizontal legs 38 of both the first and second halves 26, 28. The distance 61 is defined between the horizontal legs 38 of the first half 26. Likewise, the distance 61 is defined between the horizontal legs 38 of the second half 28. The distance 61 may be equal between the first half 26 in the second half 28 or may vary between the first half 26 and the second half 28. For example, the distance 61 between the horizontal legs 38 of the first half 26 may be greater than the distance 61 between the horizontal legs 38 of the second half 28. In a similar manner the distance 61 between the horizontal legs 38 of the second half 28 may be greater than the distance 61 between the horizontal legs 38 of the first half 26.

The distance 61 may be constrained by the first and second angles $\alpha$, $\beta$ as well as the packaging space available for the frame 16. For example, variations within the first angle $\alpha$ may increase or decrease the distance 61 in order to optimize energy absorption through the frame 16 by either reducing or increasing the amount of flax of the frame 16 during an impact. Again, the distance 61 may be optimized depending on the packaging space, the first and second angles $\alpha$, $\beta$, as well as loading dynamics from various impact scenarios. The distance 61 further aids the frame 16 via the plurality of legs 36 and the area 42 to absorb and distribute impact energy from multiple and various impact scenarios across and throughout the frame 16. The distance 61 provides further structural rigidity to the vehicle 10.

The plurality of legs 36 may be formed using a substantially rigid material. For example, the plurality of legs 36 may be formed from 4 mm steel. In at least one other embodiment, the plurality of legs were 36 may be composed of aluminum, titanium, beryllium, magnesium, or any other light weight or high-strength material which allows the frame 16 to absorb energy through the plurality of legs 36. Likewise, in at least one other embodiment, the plurality of legs 36 may be formed having a thickness between 2 and 7 mm or a thickness within any other range that allows the plurality of legs 36 and therefore the frame 16 to avoid buckling under various loading dynamic characteristics. The thickness and material the plurality of legs 36 may further be optimized depending on the distance 61, the area 42, the first and second angles $\alpha$, $\beta$, the inertia of the vehicle components 44, the packaging space of the vehicle 10 as well as the overall topology for the frame 16 to account for multiple impact scenarios.

While exemplary to embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle underbody structure comprising:
a bumper;
a subframe; and
a frame interconnecting the bumper and the subframe at front and rear segments, the frame having a first half separated at a distance from a second half mirrored about a longitudinal axis, the first and second halves defining an area between at least five legs connected to the front and rear segments at first and second apexes of at least two of the five legs.

2. The underbody structure of claim 1, wherein the at least five legs encompass the area and have a substantially trapezoidal shape.

3. The underbody structure of claim 1, wherein the at least five legs are integrally formed to the front and rear segments.

4. The underbody structure of claim 1, wherein the first and second halves are separated by a support attached to at least one leg of each of the first and second halves.

5. The underbody structure of claim 1, wherein the legs of the first and second halves define a plurality of load paths through the first and second segments.

6. The underbody structure of claim 4, wherein the support is configured to transfer energy through the first half to the second half of the frame.

7. The underbody structure of claim 4, wherein the support is configured to transfer energy through the second half to the first half of the frame.

8. A vehicle comprising:
an underbody structure including a bumper, a subframe, and a frame interconnecting the bumper and the subframe, the frame including first and second symmetrical halves spaced at a distance, attached to the bumper at front segments of each of the halves, and attached to the subframe at rear segments of each of the halves, the halves being defined by a plurality of legs formed with the front and rear segments such that the first and second halves define load paths configured to transfer energy throughout the frame.

9. The vehicle of claim 8, wherein each of the halves is configured to define a substantially trapezoidal area between the legs of each of the halves.

10. The vehicle of claim 8, wherein the front segments are formed to the legs at first apexes defined by at least two of the legs for each half.

11. The vehicle of claim 8, wherein the rear segments are formed to the legs at second apexes defined by at least two of the legs for each half.

12. The vehicle of claim 8, wherein the plurality of legs includes at least five legs.

13. The vehicle of claim 8 further comprising a support disposed between and connected to the first and second halves, wherein the support is configured to define a load path from either half to the other of the halves.

14. The vehicle of claim 8, wherein the second half is mirrored from the first half about a longitudinal axis extending from the bumper to the subframe.

15. A frame for a vehicle comprising:
a plurality of legs joined at a front segment to attach to a bumper and joined at a rear segment to attach to a subframe disposed opposite the front segment, wherein the legs are arranged to form a first half and a second half separated by a support and mirrored across a longitudinal axis, and wherein the legs are configured to form a substantial trapezoidal area between the legs such that the legs define a plurality of load paths across and throughout the front segment, the rear segment and the support.

16. The frame of claim 15, wherein the plurality of legs includes at least five legs.

17. The frame of claim 15, wherein the front segment of each half attaches at a first apex of each half formed by the legs.

18. The frame of claim 15, wherein the rear segment of each half attaches at a second apex of each half formed by the legs.

19. The frame of claim 15, wherein the legs further define a plurality of corners defined between at least two of the legs.

20. The frame of claim 19, wherein the first half and the second half each define at least six corners.

* * * * *